United States Patent
Xiang et al.

(10) Patent No.: US 10,116,926 B2
(45) Date of Patent: Oct. 30, 2018

(54) 3D SCANNING CONTROL APPARATUS BASED ON FPGA AND CONTROL METHOD AND SYSTEM THEREOF

(71) Applicant: Shenzhen ESUN Display Co., Ltd, Shenzhen (CN)

(72) Inventors: Kaibing Xiang, Shenzhen (CN); Fuhe Tian, Shenzhen (CN); Hailong Chen, Shenzhen (CN); Hongchen Zhu, Shenzhen (CN); Dong He, Shenzhen (CN)

(73) Assignee: SHENZHEN ESUN DISPLAY CO., LTD, Shenzhen (CN)

( * ) Notice: Subject to any disclaimer, the term of this patent is extended or adjusted under 35 U.S.C. 154(b) by 282 days.

(21) Appl. No.: 15/158,623

(22) Filed: May 19, 2016

(65) Prior Publication Data
US 2017/0019659 A1   Jan. 19, 2017

(30) Foreign Application Priority Data

Jul. 13, 2015 (CN) .......................... 2015 1 0410354

(51) Int. Cl.
| | |
|---|---|
| *H04N 13/296* | (2018.01) |
| *H04N 13/239* | (2018.01) |
| *H04N 13/254* | (2018.01) |
| *H04N 13/257* | (2018.01) |

(52) U.S. Cl.
CPC ......... *H04N 13/296* (2018.05); *H04N 13/239* (2018.05); *H04N 13/254* (2018.05); *H04N 13/257* (2018.05)

(58) Field of Classification Search
CPC ........... H04N 13/0239; H04N 13/0253; H04N 13/0257; H04N 13/0296
See application file for complete search history.

(56) References Cited

U.S. PATENT DOCUMENTS

| | | | | |
|---|---|---|---|---|
| 2009/0238449 | A1* | 9/2009 | Zhang | G01B 11/2536 382/165 |
| 2011/0050859 | A1* | 3/2011 | Kimmel | G01B 11/2509 348/50 |

FOREIGN PATENT DOCUMENTS

| | | |
|---|---|---|
| CN | 103985157 Y | 8/2014 |
| CN | 104457562 Y | 3/2015 |

* cited by examiner

*Primary Examiner* — Anner N Holder
(74) *Attorney, Agent, or Firm* — Hemisphere Law, PLLC; Zhigang Ma

(57) ABSTRACT

The present invention discloses a 3D scanning control apparatus based on FPGA, for controlling a 3D scanner to scan. The apparatus comprises: a first projection control module, for controlling a structured light generation unit to project to an object; a first image acquisition control module, for controlling a shooting unit to capture a projection image of the object when the first projection control module is projecting; a second projection control module, for controlling another structured light generation unit to project to the object for one more time; a second image acquisition control module, for controlling a corresponding shooting unit to capture the projection image of the object for one more time when the second projection control module is projecting; and a data processing module, for processing the captured projection images with at least one of the Bayer color rendition, color space conversion and phase unwrapping, by using algorithm in the FPGA.

17 Claims, 4 Drawing Sheets

3D SCANNING CONTROL APPARATUS BASED ON FPGA AND CONTROL METHOD AND SYSTEM THEREOF

TECHNICAL FIELD

The present invention relates to 3D scanning technology, in particular, relates to a 3D scanning control apparatus based on FPGA and method and system thereof.

BACKGROUND 3D scanning technology is a high-tech combing optical, mechanical, electrical and computer science. It is mainly used for scanning the shape, structure and color of an object, in order to obtain the spatial coordinates of the object's surface, it can transfer the stereo information of an object into digital signals that can be directly processed by a computer, thus provides very convenient and efficient measures to digitize the object. Usually, it is a computer to soft-trigger a structured light generator, to project pictures on to the target (object) to be digitized, and triggers the shooting unit to capture projection image synchronously. After the computer captures the projection image, the computer analyzes the phase information, and transfers it into 3D depth data based on the phase information carried by the projection image, to complete the 3D data capture. During the process, when the structured light generator projects projection pictures, each projected project picture needs to trigger shooting unit to capture, the synchronousness of the projection and capture directly relates to the accuracy of the 3D data and the completeness of the captured projection image; if the captured data is sent back to the computer to be processed without undergoing some processing in advance, packet dropping may occur and may lead to data missing. Meanwhile, due to the restriction of the data socket as gigabyte network port, HDMI, the expandabilty of the system is restricted, and cannot satisfy data acquisition of multiple systems.

SUMMARY

The present invention is directed to providing a 3D scanning control apparatus and method based on FPGA, for improving the control of the 3D scanning system.

In one embodiment, it is provided a 3D scanning control apparatus based on FPGA, for controlling a 3D scanner to scan, the apparatus comprises: a first projection control module, for controlling a structured light generation unit to project to an object; a first image acquisition control module, for controlling a shooting unit to capture a projection image of the object when the first projection control module is projecting; a second projection control module, for controlling another structured light generation unit to project to the object for one more time; a second image acquisition control module, for controlling a corresponding shooting unit to capture the projection image of the object for one more time when the second projection control module is projecting; and a data processing module configured for processing the captured projection images with at least one of the Bayer color rendition, color space conversion and phase unwrapping, by using algorithm in the FPGA.

In another embodiment, it is provided a 3D scanning control method based on FPGA, the method comprises: controlling at least one shooting unit to capture projection image of an object when at least one structured light generator is projecting to the object; controlling at least another one shooting unit to capture projection image of the object when controlling at least another one structured light generator to project to the object for one more time; and processing the captured projection images with at least one of the Bayer color rendition, color space conversion and phase unwrapping, by using algorithm in the FPGA.

In another embodiment, it is provided a 3D scanning system, comprising: a first projection control module configured for controlling at least one structured light generation unit to project to an object; a first image acquisition control module configured for controlling at least one shooting unit to capture at least one projection image of the object when the first projection control module is projecting; a second projection control module configured for controlling at least another one structured light generation unit to project to the object for one more time; a second image acquisition control module configured for controlling at least one corresponding shooting unit to capture the projection images of the object for one more time when the second projection control module is projecting; and a data processing module based on FPGA, configured for processing at least part of the captured projection images and transmitting the processed data to a computer to obtain synthetic 3D scanning images, by using the algorithm in the FPGA.

As disclosed above, the 3D scanning control apparatus based on FPGA, uses a control system based on FPGA to control the structured light generation units to project projection pictures onto the object, while controlling a shooting device to capture the projection image, to ensure the synchronousness of the projection and the acquisition; the captured projection image data is sent to the computer after data processing, to ensure the completeness of the 3D data; and the 3D scanning control apparatus is controlled by a FPGA control system, which can process at least part of the image data before transmitting the processed data to a computer to obtain synthetic 3D scanning images. It can provide better expandability, and satisfaction of 3D data capture of multiple systems, and the cost is decreased and the apparatus occupies smaller area.

BRIEF DESCRIPTION OF THE DRAWINGS

In order to illustrate more clearly with prior arts or embodiment of the present invention, the figures needed to be used in the embodiments of the present invention or prior arts will be described briefly in the following section. It is noted that the figures described below only relate to some embodiments of the present invention. For ordinary person skilled in the art, some other drawings according to these drawings can be easily got without paying creative work.

DETAILED DESCRIPTION

To make the objectives, technical solutions, and advantages of the present invention clearer, the present invention is further described in detail in combination with specific embodiments and attached drawings. It should be understood that the embodiments described here are only exemplary ones for illustrating the present invention, and are not intended to limit the present invention.

3D scanning technology is mainly used for scanning shape, structure and color of an object, in order to obtain the spatial coordinates of the object's surface, the importance of it is that it can transfer the stereo information of an object into a digital signal that can be directly processed by a computer, thus provides very convenient and efficient measures to digitize the object. 3D scanner is a scientific instrument which implements the 3D scanning technology, to detect and analyze the geometric construction and exterior data (such as color, surface albedo, etc.) of an object or environment in the real world. The captured data is used for 3D reconstruction calculation, to construct digital model for physical object in the virtual world. These models have very broad usage, like industrial design, defects detection, reverse engineering, robots guidance, topography measurement, medical information, biological information, criminal identification, digital historical relics collection, movie production, game creation material, etc.

Figure 1:
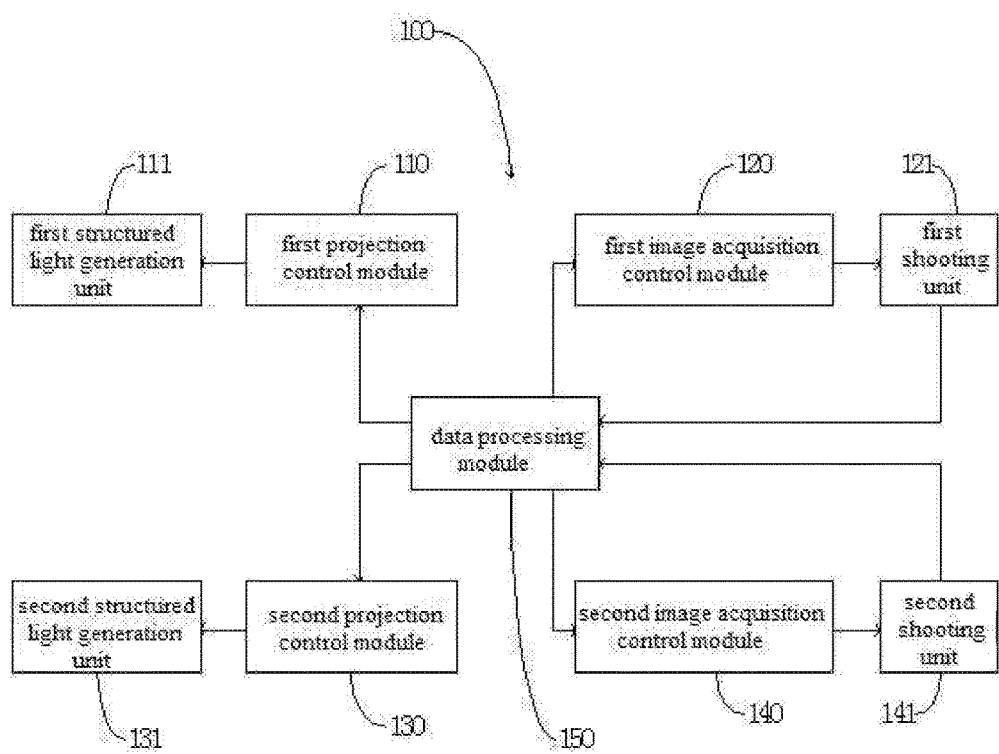
FIG. 1 is a block diagram of a 3D scanning control apparatus based on FPGA according to a first embodiment of the invention.

Please refer to FIG. 1, FIG. 1 is a block diagram of a 3D scanning control apparatus based on FPGA (Field Programmable Gate Array) according to a first embodiment of the invention. The 3D scanning control apparatus 100 based on FPGA comprises first projection control module 110, first image acquisition control module 120, second projection control module 130, second image acquisition control module 140 and data processing module 150. Wherein, the first projection control module 110 is coupled to the first image acquisition control module 120, the second projection control module 130 is coupled to the second image acquisition control module 140, the first projection control module 110, the first image acquisition control module 120, the second projection control module 130 and the second image acquisition control module 140 are all coupled to the data processing module 150. In this embodiment, all the different modules are controlled by FPGA, and the FPGA is mainly operated in parallel calculation, and implemented by hardware description language, in order to ensure synchronousness and completeness of the data.

The first projection control module 110 is coupled to a first structured light generation unit 111, the first image acquisition control module 120 is coupled to a first shooting unit 121. In this embodiment, the first structured light generation unit 111 may be a projection device to project projection picture onto a surface of an object, and the projection device is under the control of the first projection control module 110 to project projection picture onto the surface of a object 101, object 101 is the object that the 3D data to be obtained from in the invention; the first shooting unit 121 is a shooting device, and when the mentioned projection device is projection picture, the shooting device, under the control of the first image acquisition control module 120, captures the projection image projected onto the surface of the object, including the projection picture and the object 101 being covered by the projection picture.

The second projection control module 130 is coupled to a second structured light generation unit 131, the second image acquisition control module 140 is coupled to a second shooting unit 141. Wherein, second structured light generation unit 131 is a projection device with similar function of the structured light generation unit, but in a same or different type. Its projection picture is the same or different from the projection picture of the first projection control module 110.

The second shooting unit 141 is a shooting device, with similar functions of the shooting unit, and in same type or different type.

After the first shooting unit 121 captures the projection image, the second projection control module 130 controls the coupled projection device to continue projecting projection pictures onto the same area of the object 101 where the structured light generation unit 111 projects the projection picture, and while the projection device is projecting projection pictures, the shooting device which is coupled to the second image acquisition control module 140 is controlled by the second image acquisition control module 140 to capture the projection image projected onto the surface of the object.

After the first image acquisition control module 120 and the second image acquisition control module 140 control the respectively coupled shooting devices captured the projection image, the previous and latter projection images both contain the same area of the object 101. The two projection images are then sent to the data processing module 150. In this invention, the data processing module 150, by using FPGA algorithm, processes the 3D data of the projection images to implement processing like Bayer color rendition, color space conversion and phase unwrapping, after the processing, the data is packaged and sent to the computer to execute the 3D scanning operation.

In contrast to the conventional art, the 3D scanning control apparatus based on FPGA, uses a control system based on FPGA to control the structured light generation units to project projection pictures onto the object, while controlling a shooting device to capture the projection image, to ensure the synchronousness of the projection and the acquisition; the captured projection image data is sent to the computer after data processing, to ensure the completeness of the 3D data; and the 3D scanning control apparatus is controlled by a FPGA control system, this provides better expandability, and satisfaction of 3D data capture of multiple systems, and the cost is decreased and the apparatus occupies smaller area.

Figure 2:
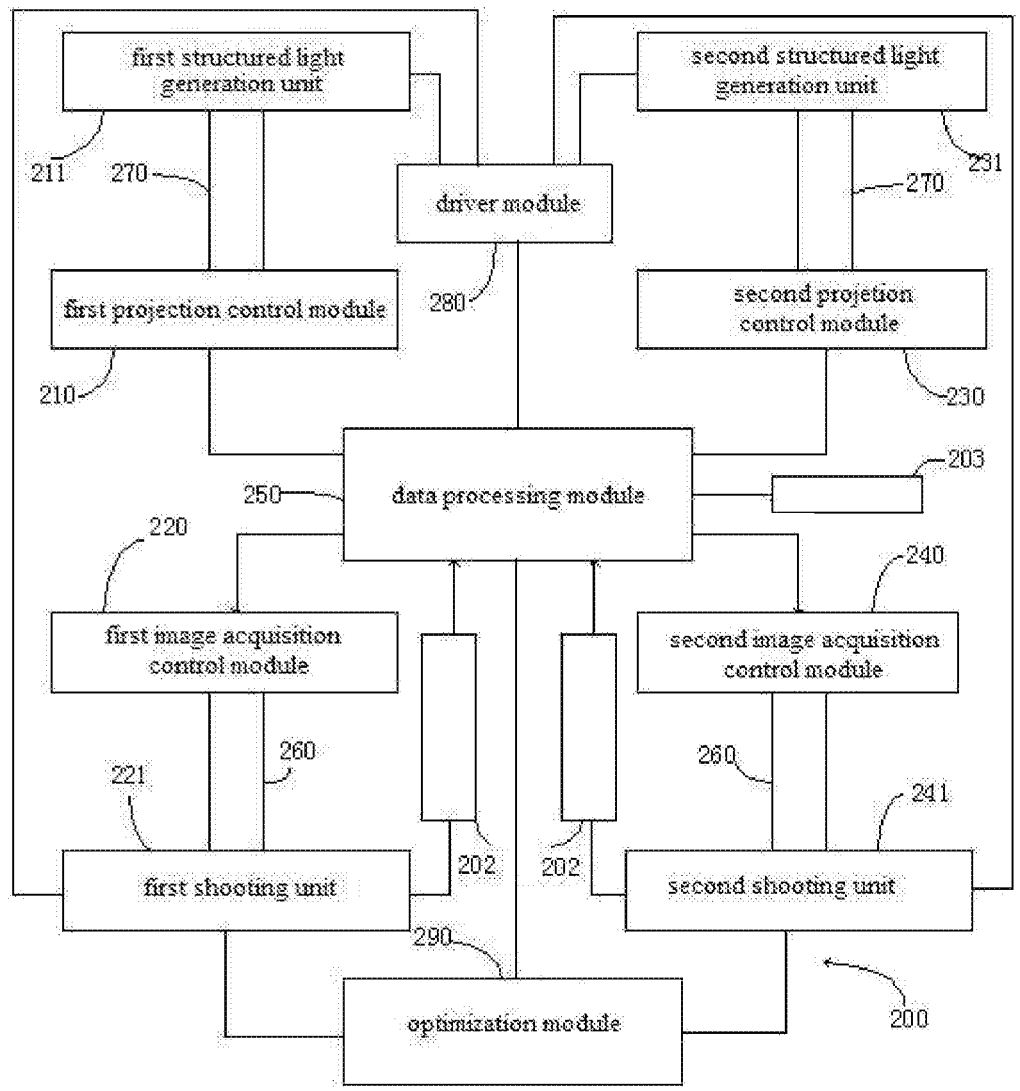
FIG. 2 is a block diagram of a 3D scanning control apparatus based on FPGA according to a second embodiment of the invention.

Please refer to FIG. 2, and FIG. 2 is a block diagram of a 3D scanning control apparatus based on FPGA according to a second embodiment of the invention. The 3D scanning control apparatus 200 comprises a first projection control module 210, a first image acquisition control module 220, a second projection control module 230, a second image acquisition control module 240, a data processing module 250, a first interface 260 and a second interface 270. Wherein, the structure and way of connection of the first projection control module 210, the first image acquisition control module 220, the second projection control module 230, the second image acquisition control module 240 and the data processing module 250 is similar to the first embodiment, the description is omitted herein for brevity.

In this embodiment, the first projection control module 210 and the second projection control module 230 are respectively coupled to a first structured light generation unit 211 and a second structured light generation unit 231 through the first interface 260, the first image acquisition control module 220 and the second image acquisition control module 240 are respectively coupled to a first shooting unit 221 and a second shooting unit 241 through the second interface 270. The first interface 260 is high definition multimedia interface (HDMI), i.e., a dedicated digital interface be suitable for video transmission and can transmit audio and video simultaneously. The second interface 270 is an information socket interface, in this embodiment, the second interface may be a gigabyte internet interface—RJ- 45 interface. Through the RJ-45 interface, the image data including the projection images of the object shot by the first shooting unit 221 and the second shooting unit 241 can be transmitted to the data processing module 250 swiftly and completely. In this embodiment, the data processing module 250 configures two second interface 270 and 2 first interface 260, wherein the second interface 270 are coupled to the first structured light generation unit 211 and the second structured light generation unit 231, each two first interface is respectively coupled to the first shooting unit 221 and the second shooting unit 241. The first interface is coupled to a computer (not shown in the figure). The first projection control module 210 and the second projection control module 230 controls the first structured light generation unit 211 and the second structured light generation unit 231 to project the projection pictures to object 201.

When the first structured light generation unit 211 and the second structured light generation unit 231 are projecting projection pictures to the object 201, they both project a plurality of projection pictures to the object 201, and capture the projection image data produced by the projection pictures. In this embodiment, the first structured light generation unit 211 and the second structured light generation unit 231 respectively projects 13 projection pictures to the object 201. The projection pictures are preferably Gray code picture. The first structured light generation unit 211 projects to the object 201 in a time interval of a first cycle when projecting each picture, the 3D scanning control apparatus 200 uses a first signal to trigger the first image acquisition control module 220 to control the first shooting unit 221 to capture the projection image data, the shooting unit then captures the projection image data for once. When the first structured light generation unit 211 projects the 13 projection pictures, the first shooting unit 221 captures the projection image data for 13 times, also in a time interval of the first cycle. Then the first structured light generation unit 211 and the second structured light generation unit 231 continues to project 13 projection pictures to the object 201 in the time interval of the first cycle. While the projection pictures are being projected, the 3D scanning control apparatus 200 again produces the first signal to trigger the second image acquisition control module 240 to control the first shooting unit 221 and the second shooting unit 241 to capture the projection images. When the structured light generation unit 211 and the second structured light generation unit 231 projects 13 projection pictures in the time interval of the first cycle, likewise, the first shooting unit 221 and the second shooting unit 241 captures the projection image data for 13 times in the time interval of the first cycle. Wherein the first signal can be a TTL high level signal, with high time efficiency, it can respond immediately. When the first structured light generation unit 211 and the second structured light generation unit 231 projects projection pictures to the object, the first signal triggers the first shooting unit 221 and the second shooting unit 241 to capture the projection image data. After the capture is completed, the projection image data is sent to the data processing module 250, after the projection image data has been processed by the data processing module 250 for data processing of Bayer color rendition, color space conversion and phase unwrapping, the processed data is sent to the computer, thus the 3D scanning data of the object 201 is obtained.

To obtain a complete 3D scanning image of the whole object 201, after the projection image data acquisition is completed, the first structured light generation unit 211 and the second structured light generation unit 231 and the first shooting unit 221 and the second shooting unit 241 direct to other side surfaces of the object 201. The 3D scanning control apparatus 200 of the invention further comprises a driver module 280, the driver module 280 can drive the first structured light generation unit 211, the second structured light generation unit 231, the first shooting unit 221 and the second shooting unit 241 to rotate by an angle, with the object 201 as the axis and a second cycle as a time interval. After the rotation, they continue the aforementioned projection, acquisition and transmission, until the driver module 280 drives the first structured light generation unit 211, the second structured light generation unit 231, the first shooting unit 221 and the second shooting unit 241 to rotate a complete circle (i.e. 360 degrees), and the whole projection image data is obtained. The second cycle is at least 13 times of the first cycle. To obtain good projection image data for the first shooting unit 221 and the second shooting unit 241, the 3D scanning control apparatus 200 further comprise an optimization module 290, which provides a soft light environment for the first shooting unit 221 and the second shooting unit 241 during the acquisition. In this embodiment, the driver module 280 and the optimization module 290 are both coupled to the data processing module 250 through a third interface (not labeled). The third interface may be a D-sub25 interface. The data processing module 250 generates a PWM level waveform signal to pass through the D-sub25 interface to the driver module 280, to let the driver module 280 rotate the structured light generation units and the shooting units according to the second cycle. To prevent the dropping of the projection image data, a first memory 202 is configured between the first shooting unit 221, the second shooting unit 241 and the data processing module 250. The projection image data is packeted by the first memory 202 and then sent to the data processing module 250 to carry on data processing of the Bayer color rendition, color space conversion and phase unwrapping. Then the processed projection image data is sent to the second memory 203, for the second memory 203 to send to the computer (not shown in the figure) to synthesize the 3D scanning image.

In this embodiment, the first cycle is 200 ms, this increases the synchronism between the picture projection of the structured light generation units and the projection image data acquisition of the shooting units. The captured projection image data by the shooting units is processed by the data processing module 250, which is controlled by a FPGA chip. The data is preliminarily processed and packeted before being sent to the computer, in order to avoid packet dropping in the data transmission.

In contrast to the conventional art, the 3D scanning control apparatus based on FPGA of the invention controls the structured light generation units and the shooting units through FPGA, and controls the synchronism time to be 200 ms a cycle. The 3D scanning control apparatus based on FPGA of the invention applies parallel signal control, to avoid deficiency of the synchronism in the serial signal system; the 3D scanning control apparatus based on FPGA of the invention completes a preliminary data processing and packeting, to avoid packet dropping during the data transmission; these measures reduces the cost and space usage.

Figure 3:
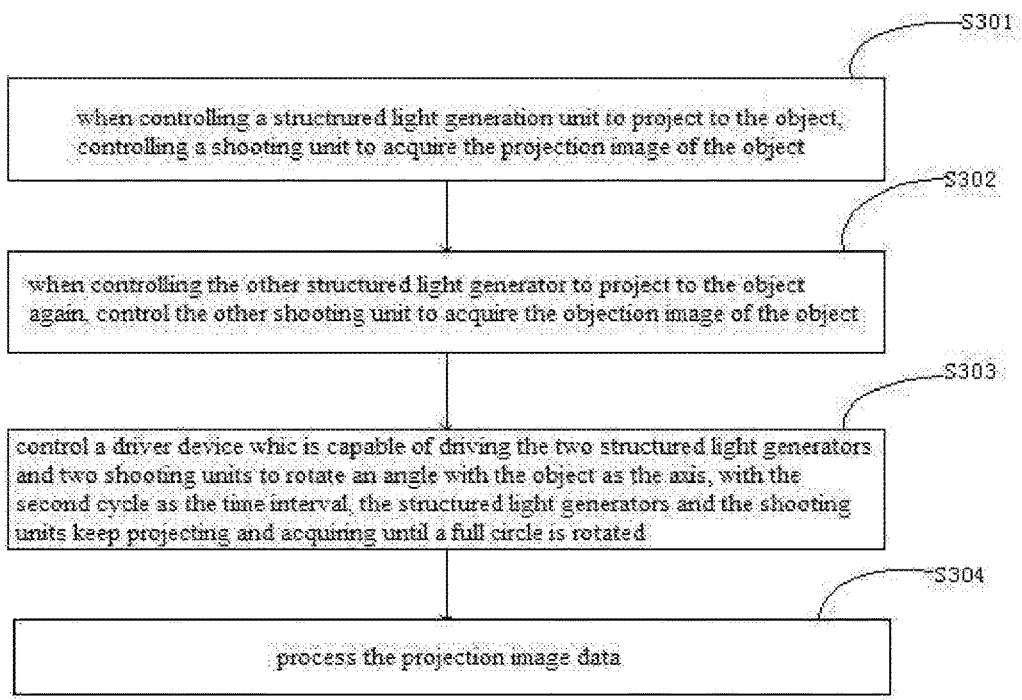
FIG. 3 is a flowchart of the 3D scanning control method based on FPGA according to a first embodiment of the invention.
Figure 4:
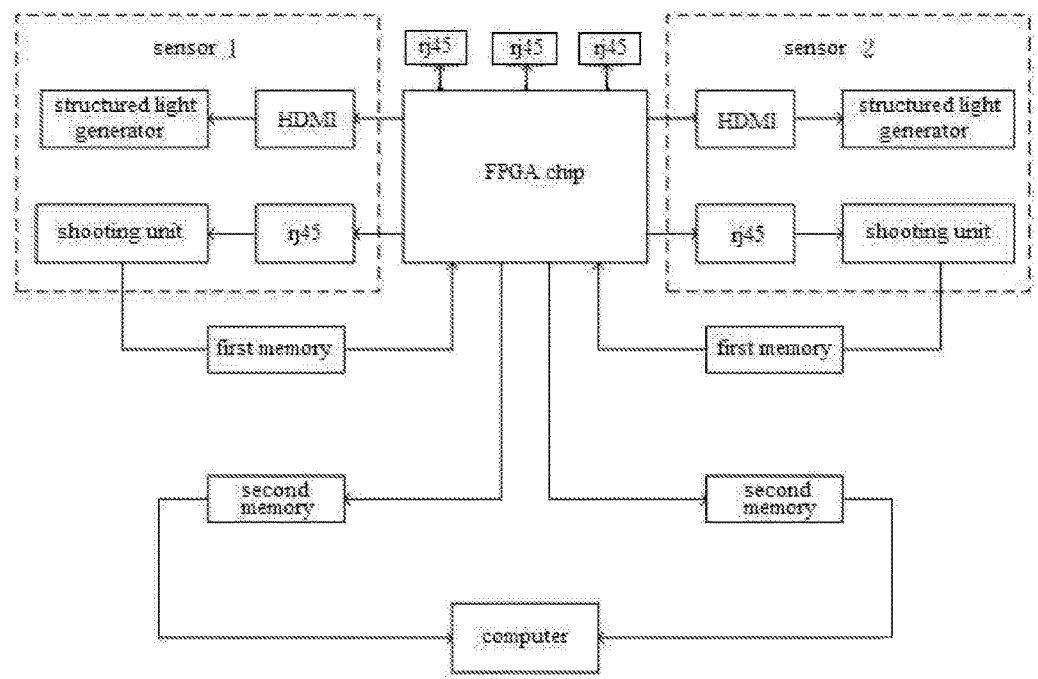
FIG. 4 is a flowchart of the circuit control of the 3D scanning control method based on FPGA according to a first embodiment of the invention.

Please refer to FIG. 3 and FIG. 4. FIG. 3 is a flowchart of the 3D scanning control method based on FPGA according to a first embodiment of the invention. FIG. 4 is a flowchart of the circuit control of the 3D scanning control method based on FPGA according to a first embodiment of the invention. The control method comprises the following steps S301 to S304.

In step S301, when controlling a structured light generation unit to project to the object, a shooting unit is controlled to capture the projection image of the object at the same time.

Based on the good system expandability of FPGA chip, the structured light generator is coupled to the FPGA chip via HDMI interface, and the shooting unit is coupled to the FPGA chip via the RJ-45 gigabyte network port. The structured light generator and the shooting unit which are coupled to the FPGA chip can project and shoot under the control of the FPGA chip. In this embodiment, FPGA chip configures five RJ-45 gigabyte network ports and two HDMI, wherein each HDMI is coupled to a structured light generator, each 2 RJ-45 gigabyte network ports is coupled to a shooting unit, the shooting unit may be a CCD camera. The left RJ-45 gigabyte network port is coupled to the FPGA chip and the computer. The structured light generator coupled to the HDMI interface and the shooting unit coupled to the two RJ-45 gigabyte network ports form two sensors, the two sensors coupled to the FPGA chip are defined as first sensor and second sensor. The FPGA chip controls the structured light generator of first sensor to project the object with Gray code picture, meanwhile controlling the CCD shooting unit of the first sensor to capture the projection image data. The FPGA chip triggers the CCD shooting unit to expose by inputting a TTL high level signal, to make the projection of the structured light generator and the acquisition of the shooting unit synchronous. The captured projection image data is transmitted to the FPGA chip through the RJ-45 gigabyte network port, preferably, the projection image data is Gige Vison protocol video image data. To get clear and complete projection image data, the structured light generators of the first sensor and the second sensor to project several same or different pictures to the object. In this step, the structured light generator of the first sensor projects 13 projection pictures to the object with a time interval of a first cycle, preferably, the first cycle is 200 ms. Every time the structured light generator of the first sensor projects a projection picture, the FPGA chip inputs a TTL high level signal to trigger the CCD shooting unit to expose, and to capture the projection image data, until all 13 projection pictures are projected. After the projection and acquisition operations of the structured light generator and the shooting unit in first sensor are completed, enter step S302.

In step S302, when controlling the other structured light generator to project to the object again, the other shooting unit is controlled to capture the objection image of the object at the same time.

In this step, the FPGA chip controls the second sensor to execute same operations as the first sensor. Enter step S303.

In step S303, a driver device is controlled to drive the two structured light generators and two shooting units to rotate an angle with the object as the axis, and with the second cycle as the time interval, the structured light generators and the shooting units keep projecting and capturing until a full circle is rotated.

To get the complete 3D scanning image of the object, the structured light generators and the shooting units need to circle the object for a full round. The FPGA chip is coupled to a driver device and an optimization device through a D-sub25 interface, the driver device is usually a step motor, the step motor is coupled to the first sensor and the second sensor. The optimization device provides a soft light environment when the CCD shooting unit captures the projection image data. The FPGA chip controls the step motor, to make the first sensor and the first sensor to work as one entirety, to rotate a certain angle with the object as the axis and the second cycle as the time interval, then continues the operations in step S301 and step S302. The second cycle is at least 13 times of the first cycle. After the first sensor and the second sensor are driven by the step motor around the whole circle, the acquisition of the projection image data is completed, enter step S304.

In step S304, at least part of the projection image data are processed in the FPGA chip.

After the shooting units have captured all the projection image data, the data are sent to the FPGA chip through the RJ-45 gigabyte network port, the FPGA chip packets the data after the Bayer color rendition, color space conversion and phase unwrapping, then the data is transmitted to the computer through the RJ-45 gigabyte network port, to obtain the final 3D scanning image. In order to prevent the dropping of the projection image data, first memory is configured between the shooting unit and the FPGA chip of the first sensor and the second sensor. The projection image data is packeted by the first memory, then sent to the FPGA chip for the Bayer color rendition, color space conversion and phase unwrapping. Then the processed projection image data is sent to the second memory, for the second memory to transmit to the computer to synthesize the 3D scanning image.

It is understandable, the above steps are not required to execute in the exact order described, for instance, the step S304 can be executed before the step S303.

In contrast to the conventional art, this invention discloses a 3D scanning control method based on FPGA, the method uses the FPGA chip to control 2 structured light generators to project projection pictures to the object, meanwhile controls the shooting units corresponding to the structured light generators to capture the projection image, to ensure the synchronism of the projection and the acquisition; likewise the captured projection image data is processed by the FPGA chip and then packeted and sent to the computer, to ensure the completeness of the 3D image data. Given the good system expandability of the FPGA chip, multiple systems can be integrated for the 3D data acquisition, thus reduces the cost and the device occupation area. Note that by describing the above embodiments, those skilled in the art can clearly understand that the present invention may be implemented by software plus a necessary hardware platform, and definitely may also be implemented by all the hardware. Based on this understanding, technical solutions of the present invention is to contribute to the background art, all or part may be embodied in the form of a software product, which computer software product may be stored in a storage medium, such as ROM/RAM, magnetic disk, optical disk, etc., includes several instructions to instruct a computer device (may be a personal computer, a server, or network equipment) to perform the various embodiments of the invention, or certain parts of the method according to the embodiment.

Described above are merely preferred embodiments of the present invention, but are not intended to limit the present invention. Any modification, equivalent replacement, or improvement made without departing from the spirit and principle of the present invention should fall within the protection scope of the present invention.

What is claimed is:

1. A 3D scanning control apparatus based on FPGA (Field Programmable Gate Array), for controlling a 3D scanner to scan, wherein the apparatus comprises:
   a first projection control module configured for controlling at least one structured light generation unit to project to an object;

a first image acquisition control module configured for controlling at least one shooting unit to capture at least one projection image of the object when the first projection control module is projecting;

a second projection control module configured for controlling at least another one structured light generation unit to project to the object for one more time;

a second image acquisition control module configured for controlling at least one corresponding shooting unit to capture the projection images of the object for one more time when the second projection control module is projecting; and a data processing module configured for processing the captured projection images with at least one of the Bayer color rendition, color space conversion and phase unwrapping, by using algorithm in the FPGA;

a driver module coupled to the structured light generation units and the shooting units via corresponding third interfaces; and an optimization module coupled to the shooting units via other corresponding third interfaces;

wherein, the driver module is configured for driving the structured light generation unit and the shooting unit to rotate an angel with the object as the axis and a second cycle as the time interval, until a circle is rotated; the optimization module is configured for providing a soft light environment when the shooting unit is capturing the projection image.

2. The 3D scanning control apparatus based on FPGA of claim 1, wherein the first projection control module and the second projection control module are coupled to the structured light generation unit via a first interface; the first image acquisition control module and the second image acquisition control module are coupled to the shooting unit via a second interface.

3. The 3D scanning control apparatus based on FPGA of claim 2, wherein, the structured light generation unit projects one or more projection pictures to the object; when more than two projection pictures are projected, all of the projection pictures are projected by the structured light generation unit sequentially with a time interval of a first cycle, in sequence of the controlling operation of the first projection control module and the second control module.

4. The 3D scanning control apparatus based on FPGA of claim 3, wherein the data processing module is coupled to a computer via a memory, and the data processed by data processing module is stored in the memory and then packaged and sent to the computer to obtain synthetic 3D scanning images.

5. The 3D scanning control apparatus based on FPGA of claim 1, wherein the first image acquisition control module and the second image acquisition control module is triggered by a predetermined first signal, for controlling the corresponding shooting unit to capture the projection image.

6. A 3D scanning control method based on FPGA, the method comprises:

controlling at least one shooting unit to capture projection image of an object when at least one structured light generator is projecting to the object;

controlling at least another one shooting unit to capture projection image of the object when controlling at least another one structured light generator to project to the object for one more time; and driving the structured light generator and the shooting unit to rotate an angel with the object as the axis and in a time interval of a second cycle, and keeps driving the structured light generator and the shooting unit to project and capture until a complete circle is rotated, and meanwhile providing a soft light environment for capturing the projection image; and processing the captured projection images with at least one of the Bayer color rendition, color space conversion and phase unwrapping, by using algorithm in the FPGA.

7. The 3D scanning control method based on FPGA of claim 6, wherein, in the step of the structured light generator projects to the object, the structured light generator projects one or more same or different projection pictures to the object, and when more than two projection pictures are projected, the structured light generator projects all the projection pictures to the object sequentially in a time interval of a first cycle, the other structured light generator projects all the projection pictures to the object sequentially in the time interval of the first cycle after the projection of the structured light generator is completed.

8. The 3D scanning control method based on FPGA of claim 6, wherein, after the step of processing the projection image data, the method further comprises:

storing the projection image data which is processed in the FPGA; and transmitting the processed projection image data to a computer, the computer processes the projection image data to obtain 3D scanning images.

9. The 3D scanning control method based on FPGA of claim 7, wherein, before the step of processing the projection image data, the shooting units transmit the projection image data to a first memory, and then the projection image data stored in the first memory are transmitted to a data processing module to process, then the processed data is sent to a second memory and further sent to the computer.

10. A 3D scanning system, comprising:

a first projection control module configured for controlling at least one structured light generation unit to project to an object;

a first image acquisition control module configured for controlling at least one shooting unit to capture at least one projection image of the object when the first projection control module is projecting;

a second projection control module configured for controlling at least another one structured light generation unit to project to the object for one more time;

a second image acquisition control module configured for controlling at least one corresponding shooting unit to capture the projection images of the object for one more time when the second projection control module is projecting; and a data processing module based on FPGA, configured for processing at least part of the captured projection images and transmitting the processed data to a computer to obtain synthetic 3D scanning images, by using the algorithm in the FPGA;

a driver module coupled to the structured light generation units and the shooting units, and configured for driving the structured light generation unit and the shooting unit to rotate an angel with the object as the axis and a second cycle as the time interval, until a circle is rotated; and an optimization module coupled to the shooting units, and configured for providing a soft light environment when the shooting unit is capturing the projection image.

11. The 3D scanning system of claim 10, wherein the first projection control module and the second projection control module are coupled to the structured light generation unit via a first interface based on FPGA; the first image acquisition control module and the second image acquisition control module are coupled to the shooting unit via a second interface based on FPGA.

12. The 3D scanning system of claim 11, wherein the structured light generator projects one or more same or different projection pictures to the object, and when more than two projection pictures are projected, the structured light generator projects all the projection pictures to the object sequentially in a time interval of a first cycle, the other structured light generator projects all the projection pictures to the object sequentially in the time interval of the first cycle after the projection of the structured light generator is completed.

13. The 3D scanning system of claim 10, wherein the data processing module is coupled to a computer via a memory, and the data processed by data processing module is stored in the memory and then packaged and sent to the computer to obtain synthetic 3D scanning images.

14. The 3D scanning system of claim 10, wherein the first image acquisition control module and the second image acquisition control module is triggered by a predetermined first signal, for controlling the corresponding shooting unit to capture the projection image.

15. The 3D scanning control apparatus based on FPGA of claim 1, wherein the second projection control module controls the coupled projection device to project the projection images, which are captured by the first shooting unit from the object, onto the same area of the object to where the structured light generation unit projects the projection picture.

16. The 3D scanning control apparatus based on FPGA of claim 1, wherein the FPGA comprises five rj45 Gigabit network ports and two high-definition multimedia interfaces, wherein each high-definition multimedia interface is connected to one of the structured light generating unit, and each two of the rj45 Gigabit network ports are connected to one of the shooting unit, and the remaining single rj45 Gigabit network port is connected to the data processing module.

17. The 3D scanning control apparatus based on FPGA of claim 3, wherein the driver module drives the first structured light generation unit, the second structured light generation unit, the first shooting unit and the second shooting unit to rotate by an angle, with the object as the axis and a second cycle as another time interval, the second cycle is at least 13 times of the first cycle.

* * * * *